United States Patent
College et al.

(10) Patent No.: US 6,197,200 B1
(45) Date of Patent: Mar. 6, 2001

(54) METHOD OF PURIFYING FLUE GAS WASTE SLURRIES FOR USE IN GYPSUM PRODUCTION

(75) Inventors: John W. College, Pittsburgh; Bryan R. Beyer, McMurray, both of PA (US); Robert Mark Golightley, Cuyahoga Falls, OH (US)

(73) Assignee: Eastroc LLC, Shippingport, PA (US)

( * ) Notice: Subject to any disclaimer, the term of this patent is extended or adjusted under 35 U.S.C. 154(b) by 0 days.

(21) Appl. No.: 09/309,633

(22) Filed: May 11, 1999

(51) Int. Cl.$^7$ .............................. C01F 11/46; C01F 1/00
(52) U.S. Cl. .................... 210/695; 210/703; 210/758; 210/767; 210/806; 423/171; 423/490; 423/555; 106/775
(58) Field of Search .................... 423/110, 112, 423/113, 122, 132, 139, 140, 150.1, 171, 175, 244.01, 244.05, 244.07, 244.08, 555, 490; 210/695, 703, 767, 806, 758; 106/775, 784

(56) References Cited

U.S. PATENT DOCUMENTS

| | | |
|---|---|---|
| 3,326,633 | 6/1967 | Carothers et al. . |
| 4,423,016 | 12/1983 | Wirsching et al. . |
| 4,612,173 | 9/1986 | Gosch et al. . |
| 4,627,970 | 12/1986 | Kruger . |
| 4,652,433 * | 3/1987 | Asworth et al. .............. 423/112 |
| 5,169,617 | 12/1992 | Clemens et al. . |
| 5,173,284 | 12/1992 | Moisset et al. . |
| 5,312,609 | 5/1994 | College . |
| 5,362,471 | 11/1994 | Roth et al. . |
| 5,500,197 | 3/1996 | Grone . |
| 5,814,288 * | 9/1998 | Madden et al. ............ 423/244.01 |

* cited by examiner

Primary Examiner—David A. Reifsnyder
(74) Attorney, Agent, or Firm—Armstrong, Westerman, Hattori, McLeland & Naughton

(57) ABSTRACT

A method of purifying a flue gas desulfurization aqueous waste slurry containing calcium-sulfur salts and residual solid grits, fly ash, carbon and oils by supplying the aqueous waste slurry to a screening station to remove the grits, passing the grit-free aqueous waste slurry to a magnetic separator to remove fly ash components, and transferring the aqueous slurry to a floatation cell to remove carbon and oils therefrom. A purified aqueous slurry of calcium-sulfur salts is removed from the floatation cell which can be used in producing quality plaster, wallboard, or feedstock in producing α-hemihydrate gypsum.

13 Claims, 1 Drawing Sheet

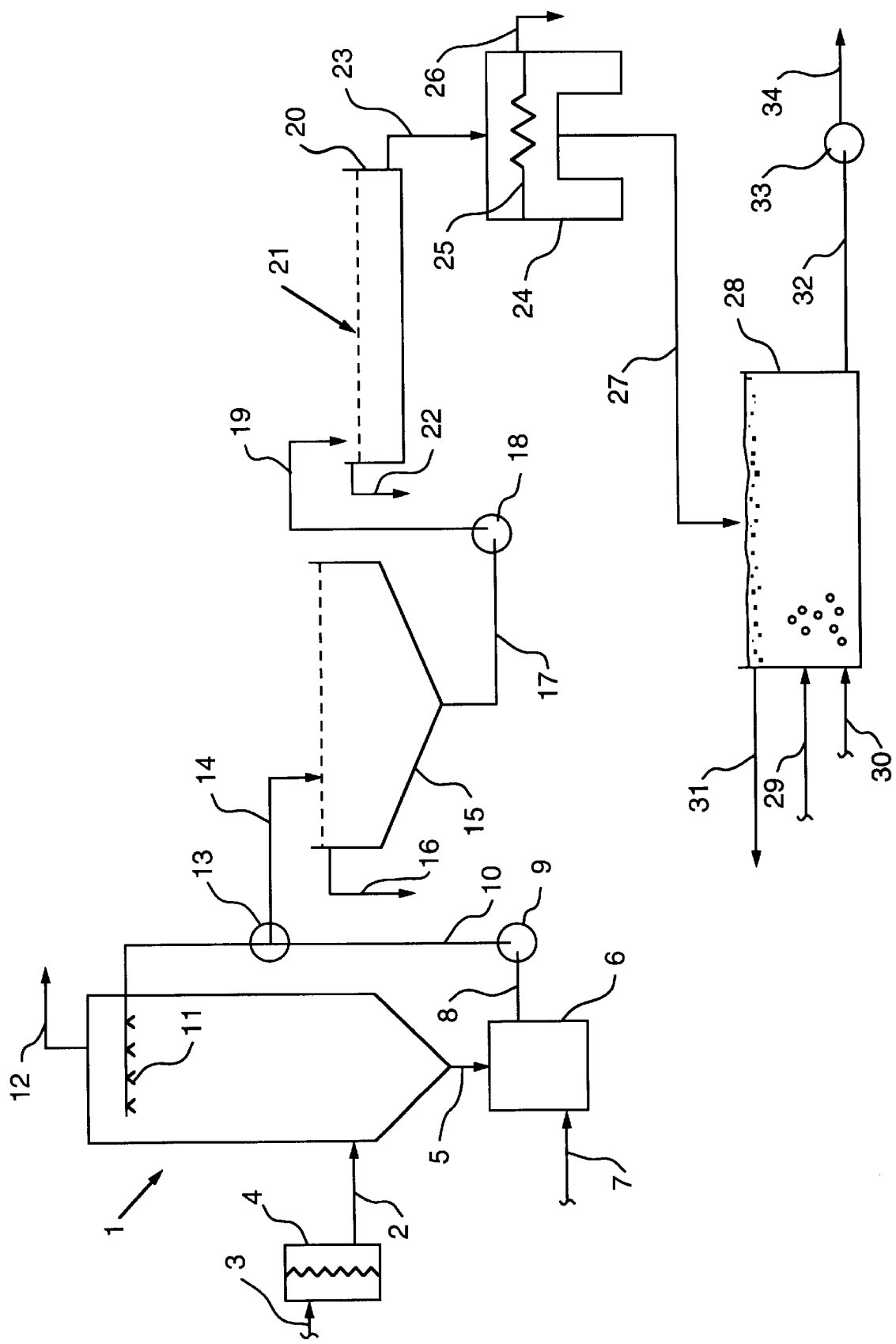

METHOD OF PURIFYING FLUE GAS WASTE SLURRIES FOR USE IN GYPSUM PRODUCTION

FIELD OF THE INVENTION

The present invention is a method for purifying aqueous waste slurries formed in sulfur dioxide removal systems that use calcium scrubbing components and form solid calcium-sulfur salts.

BACKGROUND OF THE INVENTION

Numerous processes exist for the removal of sulfur dioxide from flue gases, such as flue gases produced in electric power plants where a carbonaceous material, such as coal or oil, is combusted to produce heat and power. Such flue gases containing sulfur dioxide also contain fly ash from coal combustion, carbon and oils which sometimes pass through particulate collecting devices and are passed to the flue gas desulfurization unit and subsequently to aqueous waste slurries discharged from the flue gas desulfurization unit. When calcium scrubbing components such as limestone or lime are used to capture the sulfur dioxide, calcium-sulfur salts, such as solid calcium sulfite or calcium sulfate are formed and discharged in an aqueous waste slurry.

It is, of course, desirable to sell or use the calcium sulfite or calcium sulfate in such aqueous waste slurries so as to reduce costs, with such use being the production of gypsum or α-hemihydrate gypsum as a salable product. A problem exists, however, in that even minor amounts of grits, fly ash, carbon or oils that contaminate the gypsum product from flue gas desulfurization waste slurries seriously affect the quality of the gypsum product, since carbon and oil contaminants can cause release of paper from a core of a gypsum wallboard material, and carbon, oil or fly ash contaminants will discolor plaster formed from such a gypsum product. An additional problem exists in that when lime or limestone are used as the sulfur dioxide-capturing calcium components in a scrubber, poorly ground limestone grits or lime grits, coarse particles, may also be found in the aqueous waste slurry which are also not wanted in a wallboard or plaster byproduct. Coarse particles, if not removed, can cause lumps in the final gypsum material and are also detrimental to the color of the by-products.

Combustion burners that are operated to produce low volumes of nitrogen oxides ($NO_x$ burners) tend to produce more carbon than conventional burners, with excess carbon, at times, passing through an electrostatic precipitator. This can result in carbon reporting to the wet scrubber used for removing sulfur dioxide.

Known commercial solutions to the removal of such contaminants in aqueous waste slurries from flue gas desulfurization systems generally involve the use of a series of hydroclones. While such hydroclones are useful in removing coarse fractions from fine fractions, such solutions are limited and not totally effective.

It is an object of the present invention to provide a method for purifying an aqueous waste slurry from a flue gas desulfurization system, containing calcium sulfite or calcium sulfate solids, grit material, fly ash and carbon and oil, so as to allow use of the calcium sulfite or calcium sulfate in production of α-hemihydrate gypsum, plaster or plaster related products.

It is another object of the present invention to provide a method for purifying an aqueous waste slurry from a flue gas desulfurization system, containing calcium sulfite, grit material, fly ash, and carbon and oils, so as to provide an enhanced starting material for use in the production of α-hemihydrate gypsum or dihydrate gypsum.

SUMMARY OF THE INVENTION

A flue gas desulfurization aqueous waste slurry, resulting from a system for removing sulfur dioxide from a flue gas using calcium scrubbing components, containing solid calcium-sulfur salts, residual solid grits, fly ash containing magnetic components, carbon and oils, is purified by the present method.

The present method includes a step of supplying the aqueous waste slurry to a screening station so as to remove solid grits and other large solid particles therefrom, passing the screened aqueous waste slurry to a magnetic separator to remove magnetic components of the fly ash, and then transferring the aqueous waste slurry to a flotation cell so as to remove carbon and oils therefrom and produce a purified aqueous slurry containing solid calcium-sulfur salts, which aqueous slurry is removed from the flotation cell for subsequent treatment or use.

BRIEF DESCRIPTION OF THE DRAWING

The present invention will be more fully understood by reference to the following detailed description and the accompanying drawing which is a schematic illustration of a preferred embodiment of the present method of purifying a flue gas desulfurization aqueous waste slurry.

DETAILED DESCRIPTION

A preferred embodiment of the present invention is shown schematically in the attached drawing, which illustrates purification of an aqueous waste slurry produced by a sulfur dioxide wet scrubbing process using lime as a scrubbing component, with production of an aqueous waste slurry containing solid calcium sulfite, residual solid lime grits, fly ash containing magnetic components, carbon and oils in an aqueous medium.

A wet scrubbing system is provided having a wet scrubbing unit 1, to which a flue gas, having sulfur dioxide therein, is charged through line 2. The flue gas, from a source of combustion is fed through line 3 to a electrostatic precipitator 4, or other solids removal device, so as to remove substantially all fly ash contained therein, prior to passage to line 2 and the wet scrubbing unit 1. In the wet scrubbing unit 1, the flue gas is contacted with an aqueous scrubbing medium, such as a lime slurry, with such aqueous scrubbing medium discharged through line 5 to a recycle tank 6, to which make-up lime slurry is charged through line 7, with the aqueous scrubbing medium recycled through line 8 and pump 9 and then through line 10 to sprayers 11. Clean flue gas, from which sulfur dioxide has been removed, is discharged through line 12. A bleed stream of aqueous waste slurry is removed through valve 13 to line 14.

The aqueous waste slurry is initially preferably concentrated by passage from the wet scrubbing unit 1 through line 14 to a clarifier or thickener 15, with clarified aqueous medium removed as overflow through line 16 and the concentrated aqueous waste slurry discharged therefrom through line 17. The aqueous waste slurry in line 17 is fed through pump 18 and then through line 19 to a screening station 20. In the screening station 20, the aqueous waste slurry passes through a screen 21 which removes solid particles above a predetermined size. For example, with a calcium sulfite containing aqueous waste sludge, a screen of a mesh size of about 100–200 mesh U.S. sieve would remove solid lime grits greater than that size, which are removed through a discharge line 22, while the screened aqueous waste slurry is discharged through line 23 and passed to a magnetic separation unit 24. A 100 mesh size screen will retain particles of a diameter of about 150 microns, while a 200 mesh size screen will retain particles of about 75 microns in diameter. Removal of the grits and large particles produces a higher purity and higher strength plaster. Carbon and magnetic components, carbon at times being bound to the magnetic particles, are removed which improves the color of the plaster products. Even a low carbon content in plaster can cause a scum-like film in a plaster product, while magnetic components can also provide dark specks in a plaster. Oil, on the other hand, can cause foaming in plaster. The screening station effects removal of some of such contaminants.

In the magnetic separation unit 24, a magnetic field is applied, such as through an electromagnetic grid 25, which removes magnetic components of fly ash. The captured magnetic components of the fly ash are periodically flushed from the electromagnetic grid 25 and discharged through line 26 while the aqueous waste slurry which now has had grits and magnetic components removed therefrom is passed through line 27 to a flotation cell 28.

The magnetic separator removes residual magnetic fly ash that was not removed in the solids separator 4, the residual magnetic fly ash containing magnetite and possibly more reduced forms of iron. The form of magnetite is $Fe_3O_4$, which is produced in low nitrogen oxides ($NO_x$) burners as they are operated at reducing conditions to reduce $NO_x$ formation. Generally, this material will be fused with aluminum and silicon oxides. Carbon can also be bound to the magnetic fly ash. The fly ash is generally between a size of 1 to 50 microns in diameter.

Foaming agents are preferably added to the aqueous waste slurry through line 29, along with air through line 30, to form a froth that captures carbon and oils in the aqueous waste slurry to form a froth on the surface thereof that is removed through line 31 for disposal, while the clean aqueous waste slurry is discharged through line 32 and fed by pump 33 through line 34 for subsequent treatment or use.

Foaming agents usable to aid in separating carbon and oils from an aqueous waste slurry are known in the art and would include methyl isobutyl carbinol, kerosene, light oils, such as fuel oil No. 2, polymeric materials capable of producing a foam when mixed with air, saponified fatty acids, amides, sulfonate, pH modifiers, surfactants, monohydroxylated cresols, propylene glycol, and the like.

Such foaming agents on floatation are known in the art, and are, for example described in *Handbook of Separation Techniques for Chemical Engineers*, Second Edition, Philip a. Schweitzer, McGraw-Hill Book Company (1988) pages 1-384 to 1-385; 4-148 to 4-151; and 5-33 to 5-42, the contents of which are incorporated by reference herein.

In one specific embodiment of the present method, an aqueous waste slurry containing calcium sulfite solids is purified, the purification carried out so that the calcium sulfite solids can be used in the formation of α-hemihydrate gypsum.

A preferred process for removing sulfur dioxide from a flue gas in a wet scrubbing system using calcium and magnesium scrubbing components and forming α-hemihydrate gypsum as a byproduct is described in U.S. Pat. No. 5,312,609, issued to John W. College, one of the inventors herein, the contents of said patent being incorporated herein. In that process, an aqueous waste slurry containing calcium sulfite and calcium sulfate, of a solids content of between about 5–35 percent by weight, is charged to a pressurized oxidation vessel and contacted with an oxidizing gas at an elevated temperature and superatmospheric pressure to convert calcium sulfite to a α-hemihydrate gypsum which precipitates, and magnesium sulfite to magnesium sulfate which dissolves in the aqueous medium, with the heat of reaction resulting from the conversion used to maintain the elevated temperature and provide a portion of the pressure within the vessel, with the magnesium ions present enhancing the conversion of calcium sulfite to α-hemihydrate gypsum. The pH of the aqueous medium in the oxidation vessel is preferably maintained at a low pH, such as a pH of 2.5–5.5, with acid, as desired or required, added to the aqueous medium in the pressurized oxidation vessel to maintain the proper acidic pH. If the aqueous calcium sulfite waste slurry that is to be charged to the pressurized oxidation vessel in the above-described α-hemihydrate gypsum production process contains contaminants such as lime grits, fly ash, carbon and oils, from the flue gases treated in the wet scrubber, the contaminants can be retained in the α-hemihydrate gypsum product produced and lower the value thereof.

As an example of the purification affected by the present process, the screening station was found to reduce inerts or grits from a value of greater than 4 percent to less than 2 percent by weight; the magnetic separator reduced the magnetic components from a value of between 0.5 to 2 percent to a value of 0.01 to 0.10 percent by weight; and the floatation cell reduced the oil content from a value of about 20 parts per million to zero, while the carbon content was reduced from a value of about 600–6000 parts per million to about 30–300 parts per million.

Using the present method, a calcium sulfite and magnesium sulfite solids-containing aqueous waste slurry which also contains lime grits, fly ash, carbon and oils can be purified and used as a charge material to a pressurized oxidation vessel for production of a pure α-hemihydrate gypsum. The calcium sulfite solids, in such an aqueous waste slurry from a wet scrubbing process using a magnesium enhanced lime for scrubbing of sulfur dioxide from a flue gas stream are generally of a particle size of between about 10–60 microns. The aqueous waste slurry is passed through a screen of a 100–200 mesh U.S. sieve to remove all solids larger than the screen openings, such as lime grits remaining from the slaking of the lime used in the wet scrubbing process. The removal of such lime grits is important since those, if present in a calcium sulfite aqueous waste slurry passed to a pressurized oxidation vessel to form α-hemihydrate gypsum, would raise the pH of the aqueous medium in the pressurized oxidation vessel which would require the additional acid and the resulting added expense thereof.

What is claimed is:

1. A method of purifying a flue gas desulfurization aqueous waste slurry, removed from a wet scrubbing unit for removing sulfur dioxide from a flue gas in a wet scrubbing unit using calcium scrubbing components for said removal, with substantially all fly ash being removed prior to passage to the wet scrubbing unit, said aqueous waste slurry containing solid calcium-sulfur salts, residual solid grits, residual fly ash containing magnetic components, carbon and oils, in an aqueous medium, comprising:

supplying said aqueous waste slurry to a screening station and removing said residual solid grits from the aqueous waste slurry;

passing said aqueous waste slurry, after removal of said grits, to a magnetic separator and removing magnetic components contained in said residual fly ash from said aqueous waste slurry;

transferring the aqueous waste slurry, after removal of said residual fly ash and magnetic components, to a floatation cell and removing carbon and oils therefrom by floatation to produce a purified aqueous slurry containing solid calcium-sulfur salts; and removing said purified aqueous slurry of calcium-sulfur salts from said floatation cell.

2. The method of purifying a flue gas desulfurization aqueous waste slurry as defined in claim 1 wherein said screening station has screens sized so as to remove residual solid grits while passing said solid calcium-sulfur salts through with said aqueous solution.

3. The method of purifying a flue gas desulfurization aqueous waste slurry as defined in claim 2 wherein residual solid grits of a particle size greater than about 100–200 mesh are removed from the aqueous waste slurry in said screening station.

4. The method of purifying a flue gas desulfurization aqueous waste slurry as defined in claim 3 wherein at least a portion of solid residual solid grits are selected from the group consisting of lime and limestone.

5. The method of purifying a flue gas desulfurization aqueous waste slurry as defined in claim 2 wherein said solid calcium-sulfur salt is solid calcium sulfite of a particle size of between about 10–60 microns.

6. The method of purifying a flue gas desulfurization aqueous waste slurry as defined in claim 1 wherein said magnetic components are removed from said aqueous slurry by collection on a magnetized grid.

7. The method of purifying a flue gas desulfurization aqueous waste slurry as defined in claim 1 wherein floatation agents are added to said aqueous waste slurry in the floatation cell to aid in removing said carbon and oils therefrom.

8. A method of purifying a flue gas desulfurization aqueous waste slurry, removed from a wet scrubbing unit for removing sulfur dioxide from a flue gas in a wet scrubbing unit using calcium scrubbing components for said removal, with substantially all fly ash being removed prior to passage to the wet scrubbing unit, said aqueous waste slurry containing solid calcium sulfites, solid lime or limestone grits, residual fly ash containing magnetic components, carbon and oils, in an aqueous medium, comprising:

supplying said aqueous waste slurry to a screening station and removing solid lime or limestone grits of a particle size greater than about 100–200 mesh from the aqueous waste slurry;

passing said aqueous waste slurry, after removal of said grits, to a magnetic separator and removing magnetic components contained in said residual fly ash, by collection on a magnetized grid, from said aqueous waste slurry;

transferring the aqueous waste slurry, after removal of said residual fly ash and magnetic components, to a floatation cell and adding floatation agents thereto, and removing carbon and oils therefrom by floatation to produce a purified aqueous slurry containing solid calcium sulfite; and removing said purified aqueous slurry of calcium sulfite from said floatation cell.

9. A method of purifying a flue gas desulfurization aqueous waste slurry, removed from a wet scrubbing unit for removing sulfur dioxide from a flue gas in a wet scrubbing unit using calcium scrubbing components for said removal, with substantially all fly ash being removed prior to passage to the wet scrubbing unit, said aqueous waste slurry containing solid calcium sulfites, solid lime or limestone grits, residual fly ash containing magnetic components, carbon and oils, in an aqueous medium, comprising:

supplying said aqueous waste slurry to a screening station and removing solid lime or limestone grits of a particle size greater than about 100–200 mesh from the aqueous waste slurry while retaining solid calcium sulfites of a particle size of between about 10–60 microns in said aqueous waste slurry;

passing said aqueous waste slurry, after removal of said grits, to a magnetic separator and removing magnetic components contained in said residual fly ash, by collection on a magnetized grid, from said aqueous waste slurry;

transferring the aqueous waste slurry, after removal of said residual fly ash and magnetic components, to a floatation cell and adding floatation agents thereto, and removing carbon and oils therefrom by floatation to produce a purified aqueous slurry containing solid calcium sulfite; and removing said purified aqueous slurry of calcium sulfite from said floatation cell.

10. The method of purifying a flue gas desulfurization aqueous waste slurry as defined in claim 9 wherein said magnetic components are removed from said aqueous slurry by collection on a magnetized grid, and removal therefrom.

11. The method of purifying a flue gas desulfurization aqueous waste slurry as defined in claim 9 wherein floatation agents are added to said aqueous waste slurry in the floatation cell to aid in removing said carbon and oils therefrom.

12. The method of purifying a flue gas desulfurization aqueous waste slurry as defined in claim 9 further comprising, passing said purified aqueous slurry of calcium sulfite removed from said floatation cell as a feedstock for the preparation of α-hemihydrate gypsum; and preparing α-hemihydrate gypsum by oxidation thereof under pressure and with added acid, with lime or limestone grits removed which would require additional acid in said oxidation to maintain a selected pH.

13. A method of purifying a flue gas desulfurization aqueous waste slurry, removed from a wet scrubbing unit for removing sulfur dioxide from a flue gas in a wet scrubbing unit using calcium scrubbing components for said removal, with substantially all fly ash being removed prior to passage to the wet scrubbing unit, said aqueous waste slurry containing solid calcium sulfites, solid lime or limestone grits, residual fly ash containing magnetic components, carbon and oils, in an aqueous medium, comprising:

supplying said aqueous waste slurry to a screening station and removing solid lime or limestone grits of a particle size greater than about 100–200 mesh from the aqueous waste slurry, while retaining solid calcium sulfites of a particle size of between about 10–60 microns in said aqueous waste slurry;

passing said aqueous waste slurry, after removal of said grits, to a magnetic separator and removing magnetic components contained in said residual fly ash, by collection on a magnetized grid, from said aqueous waste slurry;

transferring the aqueous waste slurry, after removal of said residual fly ash and magnetic components, to a floatation cell and adding floatation agents thereto, and removing carbon and oils therefrom by floatation to produce a purified aqueous slurry containing solid calcium sulfite;

removing said purified aqueous slurry of calcium sulfite from said floatation cell;

passing said removed purified aqueous slurry of calcium sulfite as a feedstock for the preparation of α-hemihydrate gypsum; and preparing α-hemihydrate gypsum by oxidation thereof under pressure with added acid.

\* \* \* \* \*